United States Patent [19]

Dexheimer

[11] 4,384,104
[45] May 17, 1983

[54] FIBER LUBRICANTS FORMED BY POLYOXYALKYLATION OF EPOXY RESIN DERIVATIVES

[75] Inventor: Edward M. Dexheimer, Grosse Ile, Mich.

[73] Assignee: BASF Wyandotte Corporation, Wyandotte, Mich.

[21] Appl. No.: 358,236

[22] Filed: Mar. 15, 1982

[51] Int. Cl.³ .................... C08G 59/00; C08G 65/08
[52] U.S. Cl. .................................. 528/103; 525/523; 525/533; 252/8.9
[58] Field of Search ............... 528/103; 525/523, 533; 252/8.9

[56] References Cited

U.S. PATENT DOCUMENTS 4,110,227  8/1978  Dudley et al. .................. 252/8.9
4,217,390  8/1980  Newkirk et al. ............... 252/8.9 X
4,335,003  6/1982  Nordschild et al. ............ 252/8.9

*Primary Examiner*—Lucille M. Phynes
*Attorney, Agent, or Firm*—Joseph D. Michaels

[57] ABSTRACT

Polyols which are the reaction product of a $C_2$ to $C_4$ alkylene oxide with a ring opened epoxy resin are useful as fiber lubricants having excellent thermal and oxidative stability.

9 Claims, No Drawings

FIBER LUBRICANTS FORMED BY POLYOXYALKYLATION OF EPOXY RESIN DERIVATIVES

BACKGROUND OF THE INVENTION

1. Field of the Invention

This invention relates to a polyoxyalkylated epoxy resin derivative polyol and to a process of lubricating synthetic fibers by applying the polyol thereto. More particularly the invention relates to a polyol which is the reaction product of a $C_2$–$C_4$ alkylene oxide with an epoxy resin which has been hydrolyzed with water, alcoholyzed with a $C_1$ to $C_{18}$ monofunctional alcohol, or esterified with a $C_1$ to $C_{20}$ carboxylic acid. The products of the invention are useful as fiber lubricants of unexpectedly high thermal and oxidative stability.

2. Description of the Prior Art

U.S. Pat. No. 4,094,797, Newkirk et al, relates to an oxidation stable fiber lubricant. The products of the present invention differ in that the polyols of the present invention are derived from certain epoxy resins and have not been capped on one end with an alpha olefin epoxide after oxyalkylation. The fiber lubricants of the present invention have superior oxidation stability when compared with those of U.S. Pat. No. 4,094,797. Some of the problems associated with the prior art lubricants, such as those described in the above-mentioned reference, include volatilization greater than 30 percent by weight over 24 hours at 240° C. and ticky or tacky residues. A purpose of this invention is to provide a fiber lubricant devoid of the above problems.

SUMMARY OF THE INVENTION

The invention relates to a polyol prepared by the reaction of an alkylene oxide having from 2 carbon atoms to 4 carbon atoms with a derivative of an epoxy resin, said derivative selected from the group consisting of (a) an epoxy resin hydrolyzed with water, (b) an epoxy resin alcoholyzed with a monohydric alcohol having from 1 carbon atom to 18 carbon atoms and (c) an epoxy resin esterified with a carboxylic acid having from 1 carbon atom to 20 carbon atoms, wherein said epoxy resin is a glycidyl ether of a dihydric phenol and said polyol has a molecular weight of from 1,000 to 10,000 and contains between 25 and 95 percent by weight oxyalkylene groups. The invention also relates to a process of lubricating synthetic fibers by applying thereto an amount from 0.05 percent by weight to 5 percent by weight, based on the weight of the lubricated fiber of the polyol. The fiber lubricant has improved thermal and oxidative stability.

DESCRIPTION OF THE PREFERRED EMBODIMENTS

There are three essential ingredients used in the preparation of the fiber lubricants of this invention, i.e., an epoxy resin, a ring opening agent and an alkylene oxide.

Useful as the epoxy resins for the preparation of the lubricants of this invention are glycidyl ethers of dihydric phenols. These resins are mentioned in U.S. Pat. No. 2,500,449 and are prepared by reacting a dihydric polynuclear phenol with epichlorohydrin in alkaline solution. U.S. Pat. No. 3,424,817 also discloses these resins produced by reacting bisphenol A and 1,5-dihydroxy napthalene with an epichlorohydrin or glyceryl dichlorohydrin in a sufficient amount of caustic alkali to combine with the chlorine of the chlorohydrin. Also of note is U.S. Pat. No. 3,511,882 which describes epoxides of a polyphenol, preferably a diglycidyl ether of bisphenol A. The epoxy resin compounds of the invention may, and preferably do, contain secondary hydroxyl groups, as well as primary hydroxyl groups, which contain reactive hydrogen sites suitable for reaction with the $C_2$ to $C_4$ alkylene oxides.

The epoxy resins used in a preferred embodiment of this invention have the general formula:

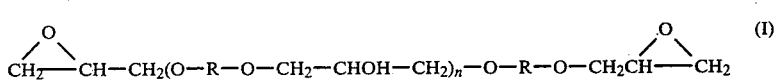

wherein n is a number from 0 to 12, preferably 0 to 6, and R represents a divalent hydrocarbon radical of a dihydric phenol.

When the dihydric phenol is bisphenol A, the formula becomes:

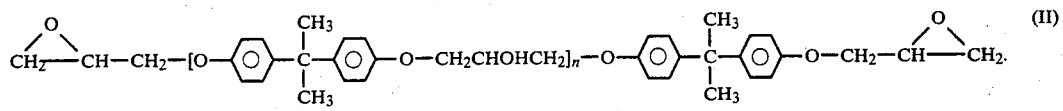

wherein n is as above. Preferably used is a mixture of the above compounds of formula (II) having an average molecular weight of 1,200 and marketed under the name Epi-Rez 522C by the Celanese Corporation.

The epoxy resin of the invention may be ring opened by reacting with a ring opening agent such as water, a suitable monofunctional alcohol or carboxylic acid. Suitable monofunctional alcohols are $C_1$ to $C_{18}$ monofunctional alcohols such as methanol and 2-ethyl hexanol. Useful as the carboxylic acid for ring opening the oxide resins of use in the invention are $C_1$ to $C_{20}$ carboxylic acids such as acetic, lauric, stearic, behenic and isostearic acid.

Useful as the alkylene oxide are $C_2$ to $C_4$ alkylene oxides such as ethylene oxide, propylene oxide and butylene oxide. Mixtures of ethylene oxide and propylene oxide and mixtures of ethylene oxide and butylene oxide may also be used. Also useful are mixtures of $C_3$ and $C_4$ cyclic ethers, such as tetrahydrofuran and methyl oxetane.

The preparation of the polyols of use in this of the invention proceeds as follows. For the ring opening of the epoxy resins with a monofunctional alcohol, the epoxy resin is typically refluxed in a mixture of the alcohol along with a solvent such as toluene to alcoholyze the epoxide groups. The alcoholyzed resin is then dried under vacuum. For the ring opening of the epoxy resins with a carboxylic acid, the epoxy resin is added to an excess of the carboxylic acid, with or without solvent and heated to cleave the epoxide rings.

The oxyalkylation of the ring opened epoxy resin with a $C_2$ to $C_4$ alkylene oxide proceeds, using between 25 percent by weight alkylene oxide and 90 percent by weight alkylene oxide relative to the weight of the polyol. The epoxy resin derivative is typically dissolved in a material such as toluene and charged to an autoclave along with a catalyst such as sodium methoxide. The solution is heated to approximately 130° C. and volatiles are removed. The solution is then heated to 140° C. and the alkylene oxide added over a period of time, such as three hours. Reaction is then continued for about one hour after addition is complete. The product is then treated with a material such as BRITESORB ® and water at 100° C. for 1½ hours, diluted with a monofunctional alcohol, filtered, and volatiles removed at 150° C. to 0.1 millimeters mercury to produce a polyoxyalkylated epoxy resin of use in this invention.

The polyol of a preferred embodiment is a compound, prepared by the reaction of the epoxy resin of formula (II) with the ring opening agent and the subsequent reaction of the ring opened epoxy resin with the alkylene oxide, said compound having the following formula:

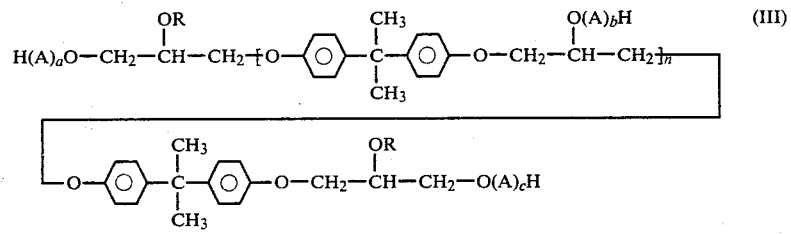

wherein A is an oxyalkylene radical containing from 2 carbon atoms to 4 carbon atoms, or mixtures thereof; R is selected from the group consisting of —$(A)_dH$, alkyl having between 1 carbon atom and 18 carbon atoms and acyl having between 1 carbon atom and 20 carbon atoms; n is a number from 0 to 12; and a, b, c and d are integers such that the approximate average molecular weight of the compound is between 1,000 and 10,000 and contains between 25 percent by weight and 90 percent by weight oxyalkylene groups.

The polyols are then tested for thermal and oxidative stability by means of a pan test in a circulating air oven at 240° C. A measured quantity of polyol is placed in a pan and inserted into a constant temperature oven. The percent by weight of material remaining at certain time intervals, such as 1 hour, 4 hours, 8 hours and 24 hours, is measured. Comments are recorded at the end of the test relative to the condition of the residue. Condition of residue is an indication of the oxidative stability and little or no degradation is preferable to black and sticky or black varnish which indicates oxidative degradation. The percent by weight of material remaining at the end of the test is an indication of the thermal stability. The products of the invention exhibit exceptional thermal stability at temperatures of 240° C. and above.

The smoke points of the polyols are determined by placing a given quantity of the material in a pan on a hot plate, heating the material at a controlled rate and determining the temperature at which the material begins to smoke. The polyols of this invention have smoke points between 205° C. and 260° C., preferably between 250° C. and 260° C. These smoke points represent a critical improvement in thermal stability since polyester and nylon fibers are commonly processed at a temperature between 225° C. and 250° C.

The polyols used in this invention are applied to fibers, preferably a nylon or polyester fiber, in an amount of from 0.05 weight percent to 5 weight percent, preferably 0.5 weight percent to 1.5 weight percent, based on the weight of the lubricated fiber and have an average molecular weight of about 1,000 to about 10,000, preferably about 1,500 to about 4,000.

The following examples will further illustrate the various aspects of the invention. Where not otherwise specified throughout the specification and claims, temperatures are in degrees centigrade, and parts, percentages and proportions are by weight.

EXAMPLES 1 through 4

An epoxy resin, being the reaction product of a dihydric polynuclear phenol and epichlorohydrin, sold by Celanese as Epi-Rez ® 522C was refluxed in a mixture of methanol and toluene to alcoholyze the epoxy groups. This epoxy resin derivative was dried under vacuum. To a one-gallon autoclave, 650 parts of the epoxy resin derivative dissolved in 433.5 parts toluene and 4.0 parts sodium methoxide were added. The solution was heated to 130° C. and 79.1 parts volatiles were removed. The solution was heated to 140° C. and 650 parts of ethylene oxide were added over a three-hour period. The reaction was continued for one hour after addition was complete. The reaction product was treated with 30 parts BRITESORB ® and 1.3 parts water at 100° C. for 1.5 hours, diluted with 1582.8 parts of methanol, filtered and volatiles were removed at 150° C. and about 0.1 millimeters mercury. The polyol was a paste and had the following properties:

cloud point: 31° C.
foam height: 600 millimeters
smoke point: 260° C.
surface tension: 45 dynes/cm The product of Example 1 will not smoke at temperatures up to 260° C. making it useful for neat fiber lubricant applications below 260° C.

Examples 2 through 4 were prepared using the basic procedure of Example 1 except that the following changes were made: the product of Example 2 was prepared utilizing 1,950 parts of ethylene oxide and had a smoke point of 208° C., the product of Example 3 was prepared utilizing 650 parts of 2-ethylhexanol in place of methanol and had a smoke point of 240° C., and the product of Example 4 was prepared using 650 parts of 2-ethylhexanol in place of methanol and 2,600 parts ethylene oxide and had a smoke point of 210° C. The following comparison example of a high temperature polyether lubricant A was prepared.

Comparison A is a block copolymer of a polyoxyethylene adduct of a polyoxypropylene adduct of bisphenol A having 80 percent by weight oxyethylene groups and an overall approximate average molecular weight of 8,350.

The thermal and oxidative stability of the polyols as measured by the pan test are presented below in Table I:

TABLE I

| Product of Example | Thermal Stability in Percent by Weight of Material Remaining | | | | |
|---|---|---|---|---|---|
| | 1 hr | 4 hr | 8 hr | 24 hr | Comments |
| 1 | 99 | 97 | 95 | 88 | a |
| 2 | 98 | 94 | 89 | 76 | a |
| 3 | 98 | 95 | 93 | 86 | a |
| 4 | 97 | 93 | 88 | 74 | a |
| A | 82 | 64 | 52 | 22 | b | a - Little or no degradation
b - Black varnish

Table I shows the superior thermal stability of the products of the application as represented by the percent of material remaining as well as the superior oxidative stability represented by a nonsticky appearance or nonvarnish appearance of the residue after completion of the test.

The embodiments of the invention in which an exclusive privilege or property is claimed are defined as follows:

1. A polyol comprising a thermally oxidatively stable compound prepared by the reaction of an alkylene oxide having from 2 carbon atoms to 4 carbon atoms with a derivative of an epoxy resin, said derivative selected from the group consisting of (a) an epoxy resin hydrolyzed with water, (b) an epoxy resin alcoholyzed with a monohydric alcohol containing from 1 carbon atom to 18 carbon atoms and (c) an epoxy resin esterified with a carboxylic acid containing from 1 carbon atom to 20 carbon atoms, wherein said epoxy resin is a glycidyl ether of a dihydric phenol and said polyol has an approximate average molecular weight of from 1,000 to 10,000 and contains between 25 and 90 percent by weight oxyalkylene groups.

2. The polyol of claim 1 having the following formula:

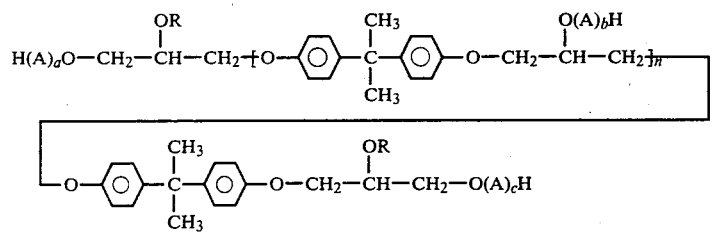

wherein A is an oxyalkylene radical containing from 2 carbon atoms to 4 carbon atoms, or mixtures thereof; R is selected from the group consisting of $-(A)_dH$, alkyl having between 1 carbon atom and 18 carbon atoms and acyl having between 1 carbon atom and 20 carbon atoms; n is a number from 0 to 12; and a, b, c and d are integers such that the approximate average molecular weight of the compound is between 1,000 and 10,000 and contains between 25 percent by weight and 90 percent by weight oxyalkylene groups.

3. The polyol of claim 2 having a smoke point between 250° C. and 260° C.

4. The polyol of claim 2 wherein A is oxyethylene, R is methyl, n is a number between 0 and 6 and a+b+c are integers chosen such that the molecular weight of the compound is between 1,000 and 10,000 and contains about 50 percent by weight oxyethylene.

5. A process of lubricating synthetic fibers which comprises applying to the fiber from 0.05 percent by weight to 5 percent by weight, based on the weight of the lubricated fiber, of a thermally oxidatively stable polyol prepared by the reaction of an alkylene oxide having from 2 carbon atoms to 4 carbon atoms with a derivative of an epoxy resin, said derivative selected from the group consisting of (a) an epoxy resin hydrolyzed with water, (b) an epoxy resin alcoholized with a monohydric alcohol containing from 1 carbon atom to 18 carbon atoms and (c) an epoxy resin esterified with a carboxylic acid containing from 1 carbon atom to 20 carbon atoms, wherein said epoxy resin is a glycidyl ether of a dihydric phenol and said polyol has an approximate average molecular weight of from 1,000 to 10,000 and contains between 25 and 90 percent by weight oxyalkylene groups.

6. The process of claim 5 wherein the polyol has a percent of residue remaining after heating for 24 hours at 240° C. of at least 70 percent by weight of the original polyol weight.

7. The process of claim 5 wherein the epoxy resin has the general formula:

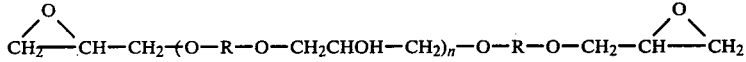

wherein n is a number from 0 to 12 and R represents a divalent hydrocarbon radical of a dihydric phenol.

8. The process of claim 7 wherein the epoxy resin is a mixture of compounds having the formula:

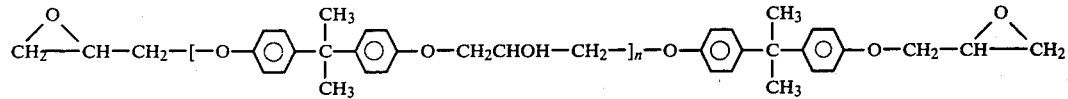

wherein n is a number from 0 to 12.

9. The process of claim 5 wherein the thermally oxidatively stable polyol has a smoke point between 250° C. and 260° C.

* * * * *